US012651372B2

(12) United States Patent
Yu et al.

(10) Patent No.: US 12,651,372 B2
(45) Date of Patent: Jun. 9, 2026

(54) METHOD, APPARATUS, AND SYSTEM FOR DETECTING AN OBJECT AND ASSOCIATED POSE FROM OVERHEAD IMAGERY DATA

(71) Applicant: HERE GLOBAL B.V., Eindhoven (NL)

(72) Inventors: Hai Yu, San Diego, CA (US); Amey Aroskar, Aurora, IL (US)

(73) Assignee: HERE GLOBAL B.V., Eindhoven (NL)

( * ) Notice: Subject to any disclaimer, the term of this patent is extended or adjusted under 35 U.S.C. 154(b) by 272 days.

(21) Appl. No.: 18/613,150

(22) Filed: Mar. 22, 2024

(65) Prior Publication Data

US 2025/0299358 A1 Sep. 25, 2025

(51) Int. Cl.
G06T 7/73 (2017.01)
G01C 21/00 (2006.01)
(Continued)

(52) U.S. Cl.
CPC ............ G06T 7/73 (2017.01); G01C 21/3815 (2020.08); G01C 21/3837 (2020.08); G06T 7/60 (2013.01);
(Continued)

(58) Field of Classification Search
CPC ... G06T 7/73; G06T 7/60; G06T 2207/10032; G06V 10/40; G06V 10/82; G06V 20/54; G06V 20/10; G01C 21/3815
See application file for complete search history.

(56) References Cited

U.S. PATENT DOCUMENTS

| | | | | |
|---|---|---|---|---|
| 10,281,925 | B2 * | 5/2019 | Sakr | G05D 1/0276 |
| 12,525,008 | B2 * | 1/2026 | Dorkenwald | G06V 10/86 |

(Continued)

FOREIGN PATENT DOCUMENTS

| | | |
|---|---|---|
| CN | 111652245 A | 9/2020 |
| CN | 112733270 A | 4/2021 |

(Continued)

OTHER PUBLICATIONS

Mo S, Shi Y, Yuan Q, Li M. A Survey of Deep Learning Road Extraction Algorithms Using High-Resolution Remote Sensing Images. Sensors (Basel). Mar. 6, 2024;24(5):1708. doi: 10.3390/s24051708. PMID: 38475244; PMCID: PMC10933758. (Year: 2024).*

(Continued)

*Primary Examiner* — Michael Robert Cammarata
(74) *Attorney, Agent, or Firm* — Michael Yu; HERE GLOBAL B.V.

(57) ABSTRACT

An approach is provided for detecting objects and associated pose from imagery data. The approach, for instance, involves processing an image using a feature representation network to generate a set of points representing the object detected in the image. Each point, for instance, has an attribute indicating a geometric part of the object. The approach also involves using the feature representation network to construct a bounding box around the set of points. The approach further involves determining a pose of the object based on the bounding box and the attribute indicating the geometric part of the object for each point. The approach further involves providing the object, the pose, or a combination thereof as an output.

17 Claims, 13 Drawing Sheets

(51) Int. Cl.

| | |
|---|---|
| *G06T 7/60* | (2017.01) |
| *G06V 10/40* | (2022.01) |
| *G06V 10/764* | (2022.01) |
| *G06V 10/82* | (2022.01) |
| *G06V 20/10* | (2022.01) |

(52) U.S. Cl.
CPC ............ *G06V 10/40* (2022.01); *G06V 10/764* (2022.01); *G06V 10/82* (2022.01); *G06V 20/10* (2022.01); *G06T 2207/10032* (2013.01); *G06T 2207/20016* (2013.01); *G06T 2207/20084* (2013.01); *G06V 2201/08* (2022.01)

(56) References Cited

U.S. PATENT DOCUMENTS

| | | | |
|---|---|---|---|
| 2019/0130182 A1* | 5/2019 | Zang .................... | G06V 20/182 |
| 2020/0301015 A1* | 9/2020 | Siddiqui .................. | G06N 3/09 |
| 2021/0026355 A1 | 1/2021 | Chen et al. | |
| 2021/0276591 A1* | 9/2021 | Urtasun ................ | G01S 13/865 |
| 2022/0214187 A1* | 7/2022 | Liu .......................... | G06T 19/00 |
| 2022/0277472 A1* | 9/2022 | Birchfield ................. | G06T 7/73 |
| 2024/0199068 A1* | 6/2024 | Pavone ............... | B60W 60/001 |
| 2025/0054269 A1* | 2/2025 | Yu ............................ | G06T 7/181 |
| 2025/0078532 A1* | 3/2025 | Zhao ................... | G06V 10/774 |
| 2025/0191268 A1* | 6/2025 | Huang ................. | G06V 10/764 |
| 2025/0259535 A1* | 8/2025 | Lu .......................... | G06V 10/82 |
| 2025/0299358 A1* | 9/2025 | Yu ...................... | G01C 21/3837 |

FOREIGN PATENT DOCUMENTS

| | | | | |
|---|---|---|---|---|
| CN | 115762173 A | | 3/2023 | |
| CN | 117152641 A | * | 12/2023 | ............ G06V 20/17 |
| WO | WO-2022016044 A1 | * | 1/2022 | .............. B60Q 1/08 |

OTHER PUBLICATIONS

X. Tang et al., "High-Definition Maps Construction Based on Visual Sensor: A Comprehensive Survey," in IEEE Transactions on Intelligent Vehicles, vol. 9, No. 10, pp. 5973-5994, Oct. 2024, doi: 10.1109/TIV.2023.3336940. (Year: 2024).*

Abualsaud, H., Liu, S., Lu, D. B., Situ, K., Rangesh, A., & Trivedi, M. M. (2021). Laneaf: Robust multi-lane detection with affinity fields. IEEE Robotics and Automation Letters, 6(4), 7477-7484. (Year: 2021).*

Zang, A., Xu, R., Li, Z., & Doria, D. (2020). Lane boundary geometry extraction from satellite imagery. arXiv preprint arXiv: 2002.02362. (Year: 2020).*

Y. Wei, F. Mahnaz, O. Bulan, Y. Mengistu, S. Mahesh and M. A. Losh, "Creating Semantic HD Maps From Aerial Imagery and Aggregated Vehicle Telemetry for Autonomous Vehicles," in IEEE Tran. Intelligent Transp. Sys. vol. 23, No. 9, pp. 15382-15395, Sep. 2022, doi: 10.1109/TITS.2022.3140423 (Year: 2022).*

Chen, Ziyi, et al. "Reconstruction bias U-Net for road extraction from optical remote sensing images." IEEE Journal of Selected Topics in Applied Earth Observations and Remote Sensing 14 (2021): 2284-2294. (Year: 2021).*

Wang et al., "Fast Vehicle Detection Based on Colored Point Cloud With Bird's Eye View Representation", Scientific Reports, vol. 13, May 8, 2023, 15 Pages.

Lin et al., "Focal Loss for Dense Object Detection", arXiv, Feb. 7, 2018, pp. 1-10.

Extended European Search Report received for corresponding European Patent Application No. 25162955.6, dated Jul. 14, 2025, 11 pages.

"Image Segmentation" Wikipedia, Retrieved on Jun. 13, 2025, Webpage available at https://en.wikipedia.org/w/index.php?title=Image_segmentation&oldid=1213381232.

Pasupa et al., "Evaluation of Deep Learning Algorithms for Semantic Segmentation of Car Parts", Complex & Intelligent Systems, vol. 8, 2022, pp. 3613-3625.

* cited by examiner

200

210

305a
305b
307a
307b
305c

301

303

NODE DATA RECORDS 1003

ROAD SEGMENT DATA RECORDS 1005

POI DATA RECORDS 1007

OBJECT DETECTION DATA RECORDS 1009

OTHER DATA RECORDS 1011

INDEXES 1013

GEOGRAPHIC DATABASE 109

GEOGRAPHIC DATA 1001

1200

METHOD, APPARATUS, AND SYSTEM FOR DETECTING AN OBJECT AND ASSOCIATED POSE FROM OVERHEAD IMAGERY DATA

BACKGROUND

One of the challenges faced by mapping service providers is to generate map data of sufficient detail and accuracy to support applications such as lane level driving path generation. Such applications require precise information about the location, shape, and orientation of road features, such as lanes. However, obtaining this information from overhead imagery captured from satellites, airplanes, drones, etc. is difficult when the system has to rely on determining road features based on where and in what directions vehicles are traveling. This is because the vehicles typically appear as very small objects in overhead imagery and/or are often occluded or surrounded by other objects, such as trees, buildings, etc. Accordingly, it is difficult for object detection systems to detect the vehicles and their poses (e.g., heading angle) from the overhead imagery. This limits the accuracy and completeness of the map data derived from overhead imagery, and thus the usefulness of the map data for applications such as lane level driving path generation.

SOME EXAMPLE EMBODIMENTS

Therefore, there is a need for an approach for detecting objects (e.g., vehicles) and their associated pose (e.g., heading angle) from overhead imagery data.

According to one embodiment, a method comprises processing an image using a feature representation network to generate a set of points representing the object detected in the image. Each point, for instance, has an attribute indicating a geometric part of the object to represent a spatial extent of the object. The method also comprises using the feature representation network to construct a bounding box around the spatial extent of the object based on the set of points. The method further comprises determining a pose of the object based on the bounding box and the attribute indicating the geometric part of the object for each point. The method further comprises providing the object, the pose, or a combination thereof as an output.

According to another embodiment, an apparatus comprises at least one processor, and at least one memory including computer program code for one or more computer programs, the at least one memory and the computer program code configured to, with the at least one processor, cause, at least in part, the apparatus to process an image using a feature representation network to generate a set of points representing the object detected in the image. Each point, for instance, has an attribute indicating a geometric part of the object to represent a spatial extent of the object. The apparatus is also caused to use the feature representation network to construct a bounding box around the spatial extent of the object based on the set of points. The apparatus is further caused to determine a pose of the object based on the bounding box and the attribute indicating the geometric part of the object for each point. The apparatus is further caused to provide the object, the pose, or a combination thereof as an output.

According to another embodiment, a non-transitory computer-readable storage medium carries one or more sequences of one or more instructions which, when executed by one or more processors, cause, at least in part, an apparatus to process an image using a feature representation network to generate a set of points representing the object detected in the image. Each point, for instance, has an attribute indicating a geometric part of the object to represent a spatial extent of the object. The apparatus is also caused to use the feature representation network to construct a bounding box around the spatial extent of the object based on the set of points. The apparatus is further caused to determine a pose of the object based on the bounding box and the attribute indicating the geometric part of the object for each point. The apparatus is further caused to provide the object, the pose, or a combination thereof as an output.

According to another embodiment, an apparatus comprises means for processing an image using a feature representation network to generate a set of points representing the object detected in the image. Each point, for instance, has an attribute indicating a geometric part of the object to represent a spatial extent of the object. The method also comprises using the feature representation network to construct a bounding box around the spatial extent of the object based on the set of points. The method further comprises determining a pose of the object based on the bounding box and the attribute indicating the geometric part of the object for each point. The method further comprises providing the object, the pose, or a combination thereof as an output.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting objects (e.g., vehicles) and their poses (e.g., heading angles) from imagery (e.g., overhead imagery) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
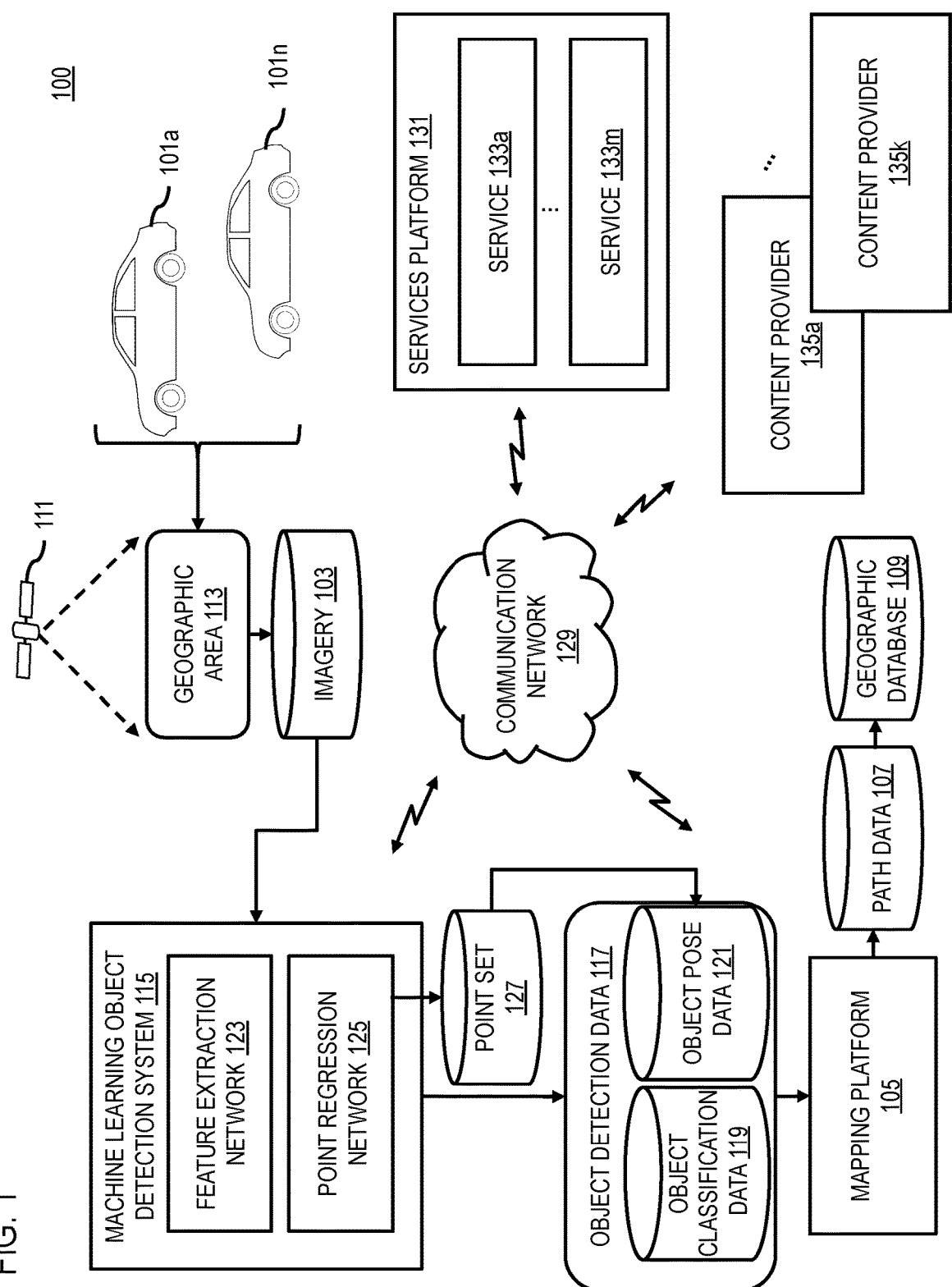
FIG. 1 is a diagram of a system capable of detecting objects and associated poses from imagery, according to one example embodiment.

FIG. 1 is a diagram of a system 100 capable of detecting objects (e.g., objects/vehicles 101a-101n, also collectively referred to as objects 101 or vehicles 101) and associated poses from imagery 103, according to one example embodiment. In automated map-making pipelines (e.g., performed by a mapping platform 105), the detection of vehicles 101 to infer vehicle travel paths (e.g., path data 107) gains even greater importance when essential road features such as lane lines, road boundaries, stop lines, or crosswalks are either absent or not visible in the overhead imagery 103. Traditional methods for road detection and mapping often rely heavily on the presence and clarity of these features to delineate road networks accurately. However, in many scenarios, particularly in remote or rural areas or during adverse weather conditions, these road markings may be obscured, faded, or altogether missing, posing significant challenges to automated mapping systems.

In such cases, leveraging the detection and tracking of vehicles 101 becomes a crucial strategy for inferring road networks (e.g., as represented in map data of a geographic database 109) and vehicle travel paths to generate path data 107. Vehicles 101 inherently follow roadways, and their movements provide valuable cues about the underlying road topology, even when explicit road markings are not visible. By analyzing the trajectories and interactions of detected vehicles 101 over time, automated mapping pipelines can infer the presence and layout of roads, intersections, and other critical infrastructure, contributing to the creation of accurate and up-to-date maps (e.g., geographic database 109). This approach not only enhances the robustness and reliability of automated mapping systems but also enables them to adapt to diverse environments and conditions where conventional road detection methods may falter. Thus, the detection of vehicles 101 serves as a cornerstone for effectively mapping road networks and facilitating navigation and transportation in various contexts.

However, detecting objects 101 such as vehicles in overhead imagery 103 captured from satellites 111, airplanes, drones, etc. poses significant technical challenges when relying on traditional feature detectors commonly used in computer vision systems. One primary obstacle stems from the scale and resolution of the imagery 103. Unlike images captured at ground level, overhead imagery 103 covers vast areas (e.g., geographic areas 113), resulting in vehicles 101 appearing as small, indistinct features. Traditional feature detectors often struggle to accurately identify and distinguish these minuscule objects 101 amidst complex backgrounds such as urban landscapes or dense foliage.

Figure 2A:
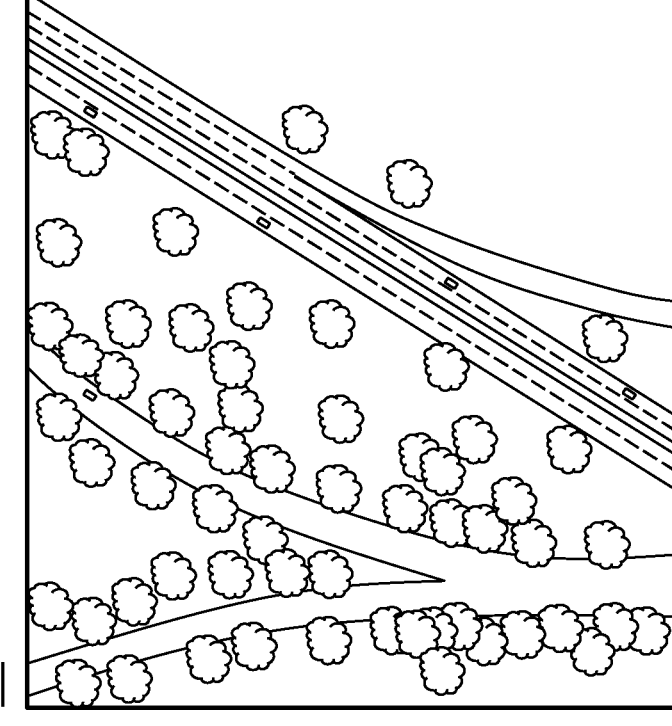
FIGS. 2A and 2B are example overhead imagery depicting objects in different environments, according to one example embodiment.
Figure 2B:
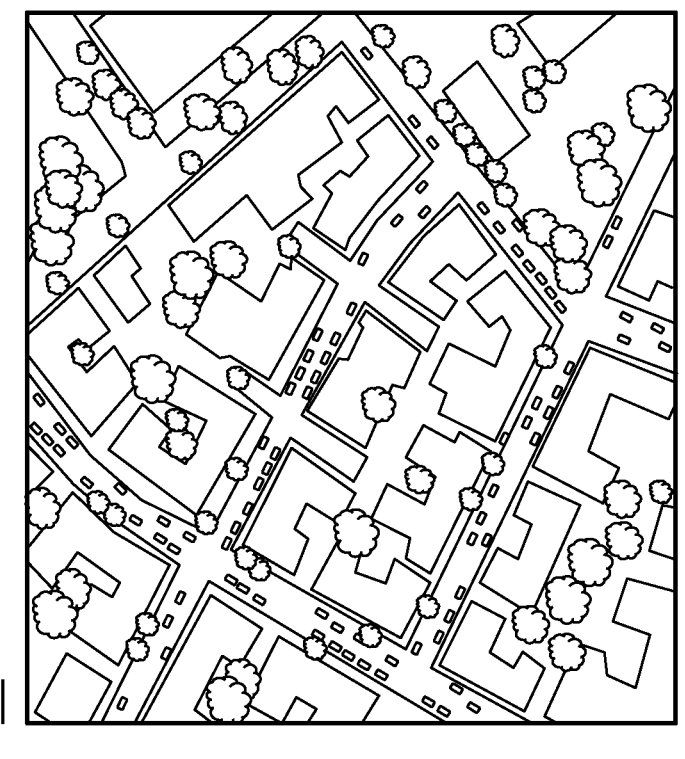

For example, FIGS. 2A and 2B are example overhead imagery 103 depicting objects (e.g., vehicles) in different environments, according to one example embodiment. As shown in FIG. 2A, an overhead image 200 exemplifies the challenges posed by detecting objects (e.g., vehicles) at minuscule object sizes and arbitrary orientation angles, which often confound traditional object detection algorithms. The image 200 showcases vehicles appearing as mere specks amidst a complex road network, where their outlines are barely discernible against the backdrop of the roads and trees. Moreover, the vehicles exhibit diverse orientations, with some positioned diagonally or obliquely relative to the image frame, further complicating their detection and classification. FIG. 2B illustrates an overhead image 220 of an even more complex road network nestled within a dense urban environment with buildings and other structures obscuring the road network and vehicles. The presence of numerous architectural features, such buildings, narrow alleys, and overlapping rooftops, further exacerbates the challenge of isolating and identifying individual vehicles. Against this backdrop, traditional object detection algorithms struggle to distinguish vehicles from their surroundings, as the sheer volume of contextual information overwhelms their capacity to parse relevant visual cues. Besides, when detecting many small objects from high-resolution imagery data (e.g., including a high volume of extraneous contextual information), processing latency can increase, which when deploying to a production data extraction pipeline, can incur increased data processing time and related costs. These factors collectively underscore the difficulty of employing conventional object detection techniques to accurately and efficiently discern and characterize vehicles or other objects within such overhead imagery 103.

Furthermore, variations in lighting conditions and viewing angles exacerbate the difficulty of detecting vehicles in overhead imagery 103. Shadows cast by surrounding structures or the sun's position can obscure vehicles 101, altering their appearance and making them less recognizable to feature detectors. Additionally, the perspective distortion introduced by the viewing angle of overhead imagery 103 further complicates the task of determining vehicle poses such as their heading angles. Traditional feature detectors, which rely heavily on local image features and geometrical cues, may fail to accurately infer the orientation of vehicles or other objects within the scene.

By way of example, in currently available perception technologies, traditional approaches treat overhead object detection as a rotated object localization problem by extending classical object detection models with an orientation regression head, which include well-known frameworks such as ReDet, Oriented RCNN, SCRDet, R3Det, etc. Many traditional approaches have transformed the problem to angular classification to address the angular discontinuity issue. The angular discontinuity problem arises from traditional angular classification methods' tendency to discretize angular measurements into predefined bins, leading to abrupt transitions between adjacent angular regions. This issue can result in misclassification or errors, particularly for objects with orientations near bin boundaries. Some traditional approaches converted the parameterization of the rotated bounding box into 2D Gaussian distributions to gain additional detection robustness.

Another group of traditional technologies relies on post-processing-based methods. For example, first, H-Bbox (horizontal bounding box) regression is carried out from a traditional object detection network, and then followed by an instance segmentation head network. The resulting object instance mask is then used to infer the final R-Bbox (rotated bounding box) by finding its minimal circumscribed rectangle.

However, despite the above approaches, traditional overhead object detection and orientation angle regression methods continue to have problems such as but not limited to:

(1) Low recall for small objects where a significant number of relevant objects within an image remain undetected by the algorithm or even no detections at all, resulting in missed detections and incomplete coverage of the object classes present in the scene.

(2) Large orientation angular error due to regression over a single angular parameter, where angular error cannot be well constrained.

(3) For post-processing methods, segmentation noise (e.g., unwanted or erroneous pixel-level variations in a segmented image) incurs inaccuracy (e.g., inconsistencies or distortions in the delineation of object boundaries) and long processing latency.

(4) Most importantly, traditional methods can only regress over limited orientation angles in the range of (−90~90) degrees and do not support a vehicle heading detection requirement in the full range of (−180~180) degrees.

Figure 3:
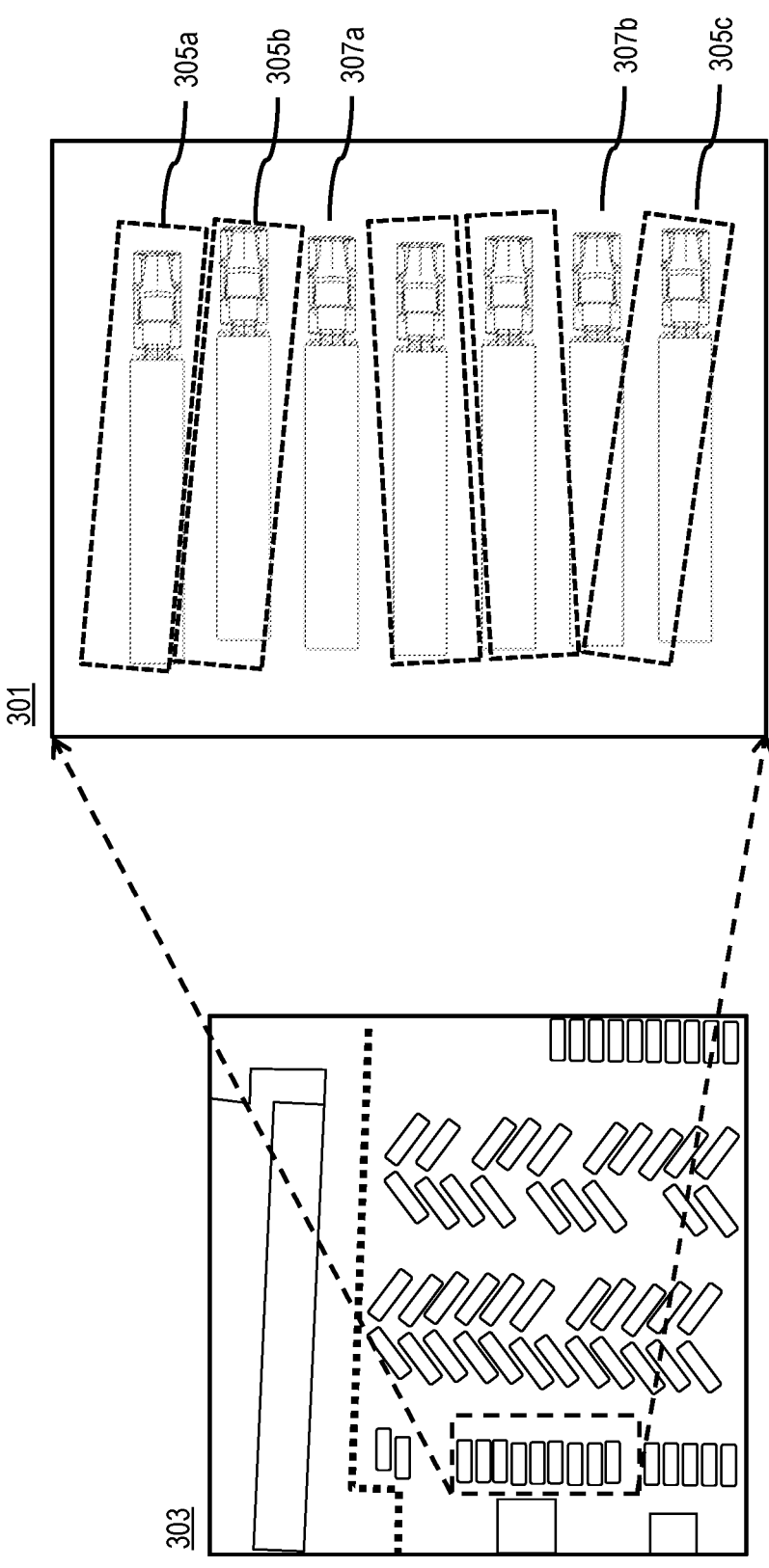
FIG. 3 is a diagram illustrating an example of traditional object detection results from overhead imagery, according to one example embodiment.

These factors potentially can lead to unsatisfactory overhead detection quality that does not have the detail or accuracy needed for high definition (HD) map generation. FIG. 3 is a diagram illustrating an example of traditional object detection results 301 from overhead imagery 303, according to one example embodiment. In the example of FIG. 3, an image 303 depicts rows of parked trucks from an overhead perspective. A traditional object detection approach, e.g., Oriented-RCNN, is used to process the image 303 to generate traditional object detection results 301. The results 301 show unsatisfactory results with instances of large angular errors 305a-305c (e.g., where the true orientation of the truck differs from the detected orientation of the truck indicated by the corresponding box by more than an angular threshold) and instances of missed detections 307a and 307b (e.g., no bounding boxes).

Thus, achieving robust and accurate vehicle detection and pose estimation in overhead imagery 103 presents significant technical challenges and necessitates the development of specialized algorithms capable of addressing these unique challenges.

To address these technical challenges, the system 100 of FIG. 1 introduces a deep learning method that can effectively detect and estimate the poses of objects such as vehicles 101 in overhead imagery 103, for instance, enabling the generation of lane-level driving paths for HD maps. As shown in FIG. 1, a machine learning object detection system 115 (e.g., a deep feature representation network) can generate object detection data 117 comprising (1) objection classification data 119 that indicates the type/class of detected object 101, and (2) object pose data 121 that indicates the pose of the detected object 101.

Unlike traditional algorithms that extract low-level features such as stop lines and crosswalks from overhead imagery 103, the various embodiments described herein leverage the rich information provided by key geometric points of detected objects to infer their poses and/or of the underlying lane-level road network and related features. In one embodiment, the various embodiments described herein address the key technical challenges of vehicle detection and pose estimation in overhead imagery, such as small object size, arbitrary orientation angles, cluttered surroundings, and complex context, by integrating a dense feature extraction network 123 and a "colored" point set regression network 125.

As used herein, a "colored" point set 127 for object detection refers to a collection of points, each associated with attributes denoting specific geometric parts-such as the front, rear, right, or left part—of the corresponding object 101 they represent. These attributes, for example, can be visually represented by assigning different colors to points associated with distinct geometric parts of the object 101. However, this coloring is only for illustration and need not performed so long as each point of the point set 127 has an attribute indicating a respective geometric part of the object 101. By analyzing the spatial distribution of this colored point set 127, the orientation (e.g., object pose data 121) of the corresponding object 101, such as a vehicle, can be profiled or inferred. This inference is possible because the physical arrangement of the geometric parts of the object 101 is either explicitly known or encoded during the training of the machine learning object detection system 115 (e.g., feature extraction network 123 and/or point regression network 125). In some embodiments, the machine learning object detection system 115 can learn to associate specific spatial configurations of colored points with particular object orientations, enabling accurate and direct inference of object poses (e.g., object pose data 121) from the detected colored point set 127.

In other words, the dense feature extraction network 123 can efficiently capture the local details and global structure of the scene, while the "colored" point set regression network 125 can directly predict the bounding boxes and heading angles of the vehicles or objects 101, using a color scheme to encode the relative orientation of each point in the point set 127. The various embodiments described herein achieves state-of-the-art performance on both vehicle detection (e.g., tasks related to generating object classification data 119) and pose estimation tasks (e.g., tasks related to generating object pose data 121), demonstrating its effectiveness and robustness for mapping road networks (e.g., geographic database 109) and vehicle travel paths (e.g., path data 107) from overhead imagery 103.

The various embodiments described herein provide for several technical advantages including but not limited to:

(1) High object/vehicle detection recalls with sufficient classification and localization precision. For example, high vehicle detection recall means that the greater than a threshold percentage of the objects 101 (e.g., vehicles) present in an image 103 is detected by the machine learning object detection system 115. Sufficient classification refers to the machine learning object detection system 115 correctly categorizing detected objects 101 above a threshold accuracy, and sufficient localization precision refers to precisely determining the pixel locations of the detected objects 101 to within target levels of accuracy and/or precision. This ensures that the machine learning object detection system 115 reliably captures nearly all instances of vehicles 101 and provides accurate information about their poses.

(2) High object/vehicle heading precision with confidence assessment. For example, high object/vehicle precision is a measure of how closely the estimated heading aligns with the actual direction of the detected object/vehicle 101, and "high" indicates that the object/vehicle precision is determined to be above a specified threshold. The confidence assessment, for instance, is the confidence of the prediction as determined by the machine learning object detection system 115.

(3) Object/Vehicle heading in full of (−180, 180) degrees. This means that, unlike traditional systems, the various embodiments described herein can detect object pose over a 360 degree range.

In summary, the various embodiments described herein present a new innovative deep learning network approach that can achieve improved detection performance over tiny objects from overhead images 103 with the additional unique capability of profiling object pose data 121 (e.g., like vehicle heading angle, pitch angle, yaw angle, etc.) while retaining a highly efficient data processing pipeline when working with high-resolution overhead imagery data 103.

This solution achieves these technical advantages, at least in part, by implementing:

(1) Dense predictions to capture fine-grained feature representation in the task domain.

(2) Point set regression for capturing better geometric information of arbitrary-oriented instances.

In one embodiment, the various embodiments of the system 100 described herein can serve as a pathway generation component in lane level road topology generation framework. For example, the feature extraction network 123 and point regression network 125 of the machine learning object detection system 115 can provide detailed spatial information about detected objects 101 (e.g., object detection data 117). By analyzing the positions and orientations of vehicles 101, this machine learning object detection system 115 alone or in combination with the mapping platform 105 contributes to understanding the layout of lanes and other road features (e.g., by generating path data 107 and map data of the geographic database 109). Integrated into the framework, the machine learning object detection system 115 helps construct an accurate representation of lane-level road topologies, facilitating tasks such as navigation, mapping, and autonomous driving.

In one embodiment, in addition or alternatively to providing the object detection data 117 to the mapping platform 105 for map generation, the machine learning object detection system 115 may have connectivity over a communication network 129 to provide or transmit the object detection data 117 to other third-party services, applications, providers, and/or any other component with connectivity to the system 100. For example, these services, providers, etc. include but are not limited to services platform 131, one or more services 133a-133m (also collectively referred to as services 133) of the services platform 131, one or more content providers 135a-135k (also collectively referred to as content providers 135). For example, object detection data 117, including detected objects 101 and associated poses, can be the basis for a multitude of services across various domains. In the realm of autonomous vehicles, this data 117 can be used for identifying and tracking surrounding vehicles, pedestrians, and cyclists, enabling safe navigation and real-time decision-making. Similarly, surveillance and security systems benefit from object detection data 117 by detecting suspicious individuals or unauthorized vehicles and utilizing the poses of detected objects 101 to understand their behavior and potential threats. In smart city infrastructure, object detection data 117 can aid in traffic management, pedestrian monitoring, and infrastructure maintenance, optimizing urban environments for efficiency and safety. Retail and marketing industries can leverage object detection data 117 for customer tracking, inventory management, and personalized marketing efforts, while industrial automation can utilize the data 117 to monitor equipment, products, and materials in manufacturing facilities or warehouses. Additionally, object detection data 117 can enhance augmented reality experiences and gaming applications by integrating virtual content seamlessly into the real-world environment based on the poses of detected objects. Overall, object detection data 117 and associated poses empower a diverse array of services and applications, facilitating informed decision-making, optimizing processes, and delivering innovative functionalities across numerous sectors. It is noted that the above example services are provided by way of illustration and not as limitations. It is contemplated that the object detection data 117 generated by the various embodiments described herein can be used for any service, application, etc.

As used herein in the context of machine learning, a network refers to an interconnected system of nodes or units arranged in layers, which collectively perform computational tasks such as object detection, classification, regression, or decision-making. These networks, often called neural networks, are inspired by the structure and function of biological neurons in the human brain. Each node in a neural network receives input signals, processes them through an activation function, and produces an output signal, which serves as input to other nodes in subsequent layers. By adjusting the weights and biases associated with connections between nodes during a training process, neural networks can learn to approximate complex functions and make predictions or decisions based on input data. Depending on their architecture and connectivity patterns, neural networks can take various forms, including feedforward networks, convolutional neural networks (CNNs), recurrent neural networks (RNNs), and more, each suited to different types of tasks and data.

Figure 4:
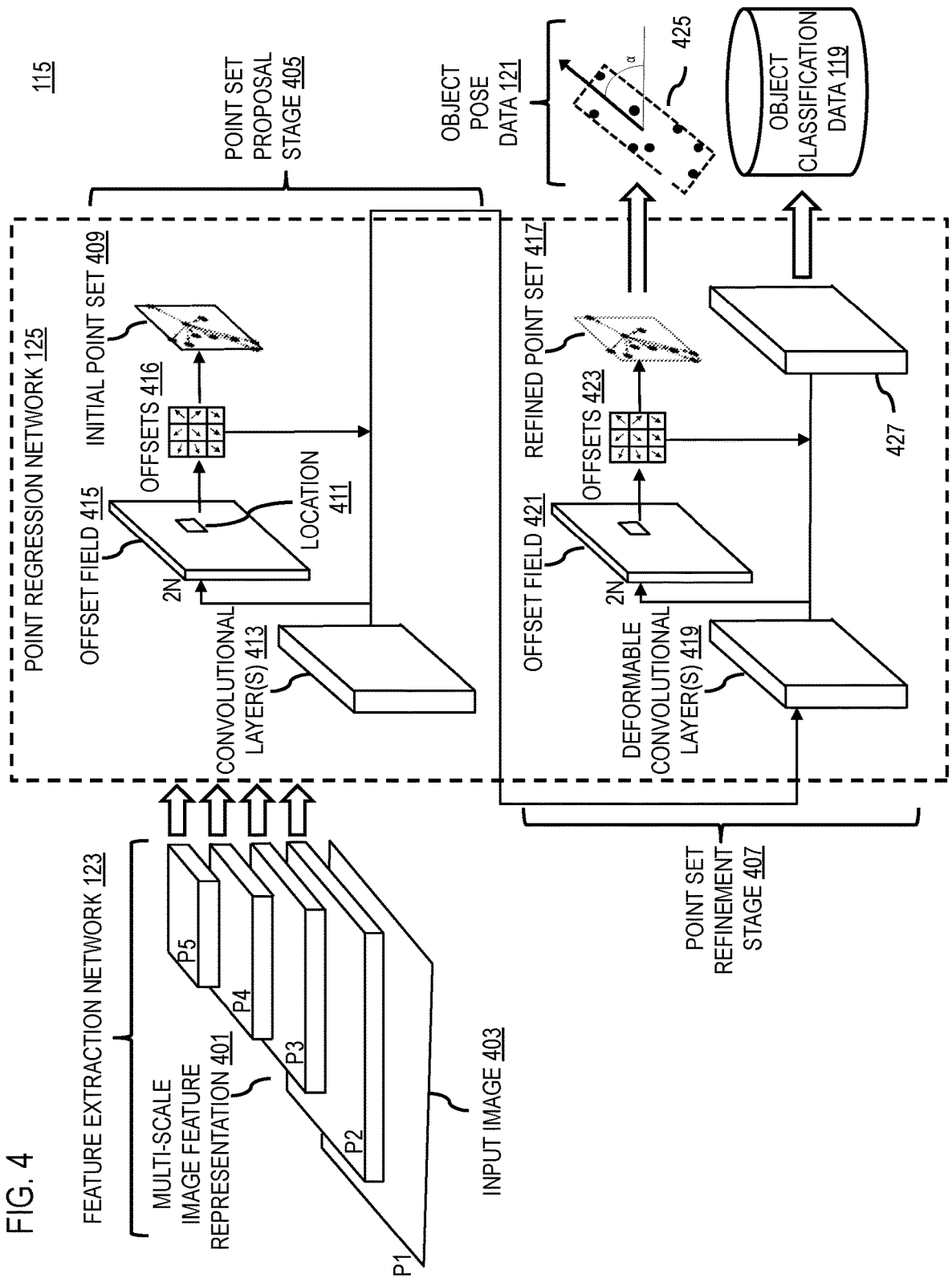
FIG. 4 is a diagram of a machine learning object detection system for detecting objects and their poses from imagery, according to one example embodiment.

FIG. 4 is a diagram of a machine learning object detection system 115 for detecting objects and their poses from imagery, according to one example embodiment. In one embodiment, the machine learning object detection system 115 performs the various approaches for object detection and pose estimation from overhead imagery 103 described herein. The system 115, for instance, is based on point regression instead of traditional bounding box regression. In other words, the various embodiments described herein uses a deep feature representation network for object detection (e.g., machine learning object detection system 115) that uses a set of points to indicate the spatial extent and pose of objects 101 (e.g., vehicles) detected from imagery 103. As shown in FIG. 4, the machine learning object detection system 115 implements a dense detection architecture (e.g., feature extraction network 123) with "colored" point set representation (e.g., point regression network 125).

First, in one embodiment, the feature extraction network 123 can use deep learning backbone modules to extract a multi-scale image feature representation 401 of an input image 403 are extracted. Examples of deep learning backbone modules that can be used for the feature extraction network 123 include but are not limited to Resnet+FPN or SWIN. For example, ResNet+FPN combines the Residual Network (ResNet) architecture with Feature Pyramid Networks (FPN), leveraging the hierarchical feature extraction capability of ResNet and the multi-scale feature fusion of FPN. This combination enhances the network's ability to capture both local and global contextual information, leading to improved performance in object detection and semantic segmentation tasks. On the other hand, SWIN (Swin Transformer) is a transformer-based architecture that utilizes hierarchical windows to efficiently capture long-range dependencies in imagery 103. SWIN replaces the conventional spatial grid structure with a hierarchical, non-overlapping window-based representation, allowing the model to effectively process imagery 103 at different scales while reducing computational complexity. SWIN is particularly well-suited for tasks requiring large receptive fields and global context understanding, such as image classification and object detection on high-resolution overhead imagery 103.

The multi-scale image feature representation 401 produced by networks like ResNet+FPN and SWIN combines features extracted at multiple levels of abstraction (e.g., labeled P1-P5 in FIG. 4) to capture information at different spatial resolutions. In ResNet+FPN, the ResNet backbone extracts features at different depths, resulting in a hierarchical pyramid of feature maps. The FPN module then integrates features from these different levels of abstraction, enhancing the network's ability to detect objects 101 at various scales. This multi-scale representation enables the network to maintain both local details and global context, facilitating accurate object detection and segmentation across different object sizes. In SWIN, the hierarchical window-based representation allows the network to capture multi-scale features efficiently. By processing image regions at different levels of granularity, SWIN can effectively model both local and global context, enabling robust performance in tasks requiring understanding of spatial relationships at various scales, such as image classification and object detection.

Next, the feature extraction network 123 feeds the multi-scale image feature representation 401 extracted from image 403 to point regression network 125. In one embodiment, the point regression network 125 is a detection head consisting of an initial point set proposal stage 405 and a point set refinement stage 407. At the initial point set proposal stage 405, an initial point set 409 is regressed from the object center of an object 101 detected in the image 403 at location 411. The initial adaptive points (e.g., indicated by offsets 416) are generated with respect to the center point from the multi-scale feature maps P1-P5 of multi-scale image feature representation 401.

As shown, in one embodiment, the point set proposal stage 405 processes the multi-scale image feature representation 401 using one or more convolutional layers 413 to generate an offset field 415. By way of example, the offset field 415 refers to a learned representation that encodes spatial displacements or offsets 416 from object center within the input image 403. The offset field 415 assists in refining the localization or alignment of predicted object boundaries or keypoints. By predicting offset values for each spatial location, the network can adjust the positions of detected objects or features, enhancing the accuracy and precision of localization tasks. In this example, the offset field 415 is designated as "2N" indicating that there are two separate sets of offset, each corresponding to one of the spatial dimensions (e.g., horizontal and vertical). This type of offset helps refine the localization of objects or features by providing adjustments along both the horizontal and vertical axes.

At the point set refinement stage 407, the initial point set 409 is refined by the assessed high quality point sets to generate a refined point set 417. In one embodiment, a point set quality assessment scheme is designed for point set learning, which measures the quality of point sets not only from the classification and localization quality, but also from the quality of their orientation and point-wise feature correlation during training. In this way, the point regression network 125 learns to predict a few points at each of the feature map locations where coordinates of these points represent key geometric location on the body of the target objects. More specifically, the point regression network 125 learns by adjusting its internal parameters or weights based on input data and associated targets during a training process. Through this process, the point regression network 125 gradually refines its ability to map input data to output predictions, minimizing the difference between predicted and actual targets. Learning in a neural network involves iteratively updating its parameters using optimization algorithms such as gradient descent, with the goal of improving its performance on object detection and pose estimation from point regression.

For example, under the supervision of the oriented ground-truth bounding boxes, the "colored" point sets learn geometric features adaptively and move towards their target semantic body parts for each object from the complex context of the annotated training imagery. Such representative key points are learned by the model to identify important locations that can be used to identify and profile the pose of objects 101 depicted in overhead imagery 103. Representative key points refer to specific locations or geometric parts of an object 101 that serve as informative landmarks for inferring its pose or heading. These key points are typically selected based on their significance in describing the object 101's spatial orientation or structure. For example, in the case of a vehicle 101, representative key points might include the front bumper, rear bumper, and side mirrors. By analyzing the spatial relationships and configurations of these key points, a system can infer the object 101's pose, such as its position, orientation, and scale relative to a reference frame. These key points play a crucial role in tasks such as object detection, pose estimation, and tracking, providing valuable information for understanding the spatial characteristics and dynamics of objects in a scene.

Accordingly, the refinement stage 407 processes the initial point set 409 and/or the multi-scale image feature representation 401 to generate the refined point set 417. In this example, the point set refinement stage 407 processes the initial point set 409 and/or the multi-scale image feature representation 401 using one or more deformable convolutional layers 419 to generate an offset field 421 with offsets 423 from which the refined point set 417 is determined (e.g., using a process similar to that described with respect to the point set proposal stage 405 with the addition of quality assessments). Unlike traditional convolutional layers 401, which use fixed grid sampling for feature extraction, deformable convolutional layers 419 allow the sampling grid to be spatially adjusted or "deformed" based on learned offsets or transformations (e.g., the initial point set 409 based on offsets 416 determined during the point set proposal stage 405). This deformation capability enables the point regression network 125 to dynamically adapt its receptive field according to the input data, improving the model's ability to capture spatial variations and deformations in objects 101. Deformable convolutional layers 419 have been shown to enhance the performance of convolutional neural networks in tasks requiring precise spatial localization and alignment of features.

The point regression network 125 then constructs an oriented bounding box 425 around the object representative key points (e.g., refined point set 417) by finding the smallest box that encloses all points (e.g., using a Min- AreaRect function or equivalent). Accordingly, a unique object pose (e.g., object pose data 121) is inferred from the refined "colored" representative point set 417 with rotated bounding box and heading angle. In one embodiment, the machine learning object detection system 115 (e.g., deep feature representation network) outputs the object pose data 121 and object classification data 119 (e.g., detected class of the object such as vehicle) via an output layer 427.

Figure 5:
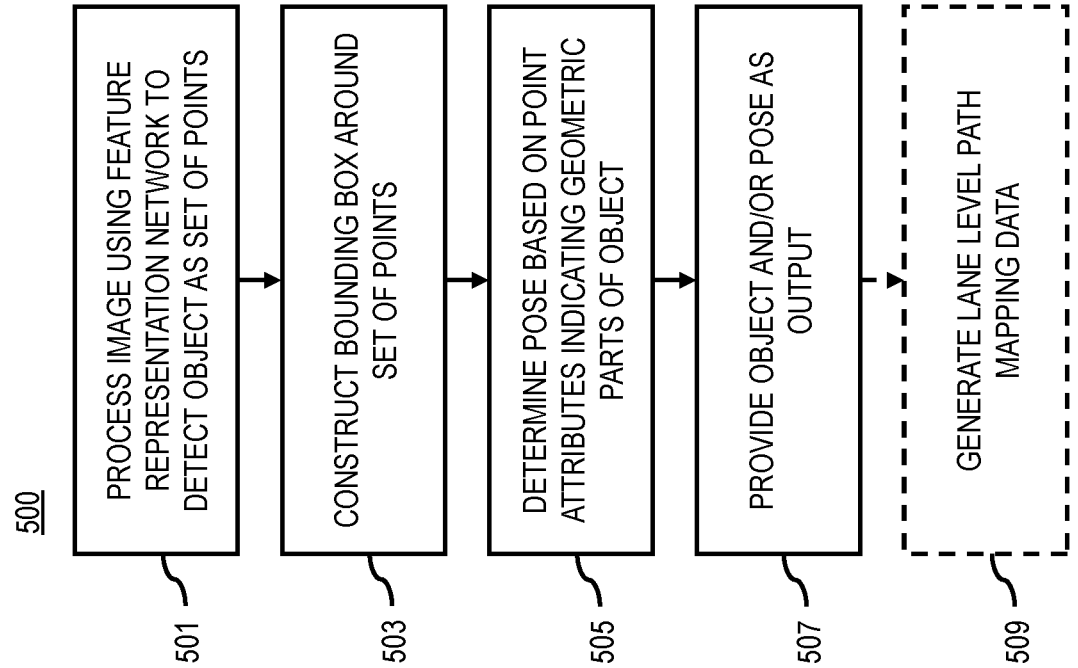
FIG. 5 is a flowchart of a process for detecting objects and their poses from imagery 103, according to one example embodiment.
Figure 12:
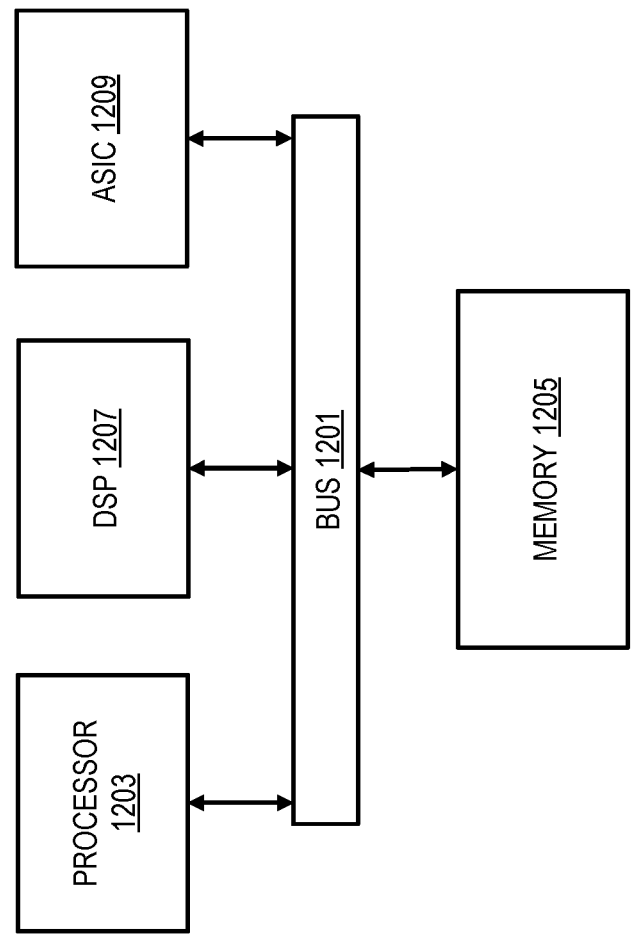
FIG. 12 is a diagram of a chip set that can be used to implement an embodiment of the invention.

FIG. 5 is a flowchart of a process 500 for detecting objects 101 and their poses from imagery 103, according to one example embodiment. In various embodiments, the machine learning object detection system 115 (e.g., a deep feature representation network), its components (e.g., the feature extraction network 123 and point regression network 125), and/or mapping platform 105 may perform one or more portions of the process 500 and may be implemented in, for instance, a chip set including a processor and a memory as shown in FIG. 12 or in circuitry, hardware, firmware, software, or in any combination thereof. As such, machine learning object detection system 115, its components, and/or mapping platform 105 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the machine learning object detection system 115 processes an image (e.g., from imagery 103) using a feature representation network to generate a set of points representing the object 101 detected in the image. As previously described with respect to FIG. 4, the feature representation network comprises a feature extraction network 123 and a point regression network 125. In the context of image analysis and object detection, a point refers to one or more pixels within an image that are classified as corresponding to a specific geometric part of an object 101. These points serve as spatial indicators or landmarks that indicate key features or regions of interest on the object 101. For instance, in the case of a vehicle, points could represent pixels identified as part of the front bumper, rear bumper, headlights, or other distinct components. By identifying and classifying these pixels as belonging to specific geometric parts, a system gains valuable information about the object's structure and spatial organization, facilitating tasks such as object recognition, pose estimation, and semantic segmentation.

Accordingly, each point has an attribute indicating a geometric part of the object 101 to represent a spatial extent of the object 101. In a machine learning model, attributes of a point can be represented as additional features associated with that point. These features can be encoded as numerical values or categorical labels that describe specific characteristics or properties of the point. In one embodiment, the geometric parts are determined from one or more semantic parts of the object, and wherein the one or more semantic parts include a front, a rear, a left side, and a right side of the object. As used herein, a semantic part of an object refer to meaningful components or regions of an object that convey specific information about its spatial extent, structure, identity, or function.

In one embodiment, to perform step 501, the machine learning object detection system 115 starts from a feature map position p=(x, y) (e.g., determined from a correspond ing multi-scale image feature representation), it directly regresses a set of points $$R' = \{p'_i = (x'_i, y'_i)\}^n_{(i=1)}$$

to represent the spatial extent of an object using:

$$p_i = p + \Delta p_i = p + g_i(F_p) \qquad (1)$$

$$p'_i = p_i + \Delta p'_i = p_i + g'_i(\{F_{pi}\}^n_i = 1) \qquad (2)$$

where $F_p$ denotes the feature representation at position p; $g_i$ and $g_i'$ are 2D linear regression and/or attention layers. By way of example, a 2D linear regression layer is utilized to perform linear regression in two dimensions, typically learning a mapping from input features to output predictions. For instance, in object detection tasks, this layer can take extracted image features as input and produce predicted bounding box coordinates for detected objects. A 2D attention layer is incorporated into models with attention mechanisms, enabling the model to focus on relevant parts of the input data while suppressing irrelevant information. Within image processing tasks, a 2D attention layer dynamically adjusts the importance of different spatial regions in an image based on their relevance to the task, allowing the model to selectively attend to informative features and improve performance in tasks like image classification and object detection.

In one embodiment, equation (1) can be used for the initial point set proposal phase (e.g., point set proposal stage 405) and equation (2) can be used for the refinement phase (e.g., point set refinement stage 407), where selected high quality point sets are refined to produce more accurate localization and pose estimations.

As previously discussed, the process 500 is based on regression of "colored" representative points. As used herein, the term "color" is not intended to mean literal coloring of the points but to indicate that point has an attribute that associates with a geometric part of an object 101 that can be used for pose estimation.

In various embodiment described herein, for any of the points regressed for representing an object 101, if they are designed all the same, that is "neutral", they can capture key characteristic points for localizing target objects, but they are insufficient for further extracting deep geometric information about the objects. For example, the heading direction for vehicles or objects 101.

To solve this insufficiency, this various embodiments described herein use "colored" point set regression method where subsets of the representative points are explicitly attributed to target geometric parts. After that, all the subsets of points will work together to support object profiling, in other words, inferring object pose from learned point set representations. For a point to be attributed to a target geometric part means that the point is associated with or assigned to a specific component or region of an object 101, typically based on its location or characteristics within the object 101. This attribution provides information about the role or identity of the point within the object's structure. For example, in the context of object detection or segmentation, a point might be attributed to the "front" or "rear" of a vehicle 101, indicating its position relative to these specific geometric features. By attributing points to target geometric parts, the machine learning object detection system 115 gain insights into the spatial distribution and organization of the object's components, facilitating tasks such as pose estimation, semantic understanding, and object manipulation within a scene.

Figure 6:
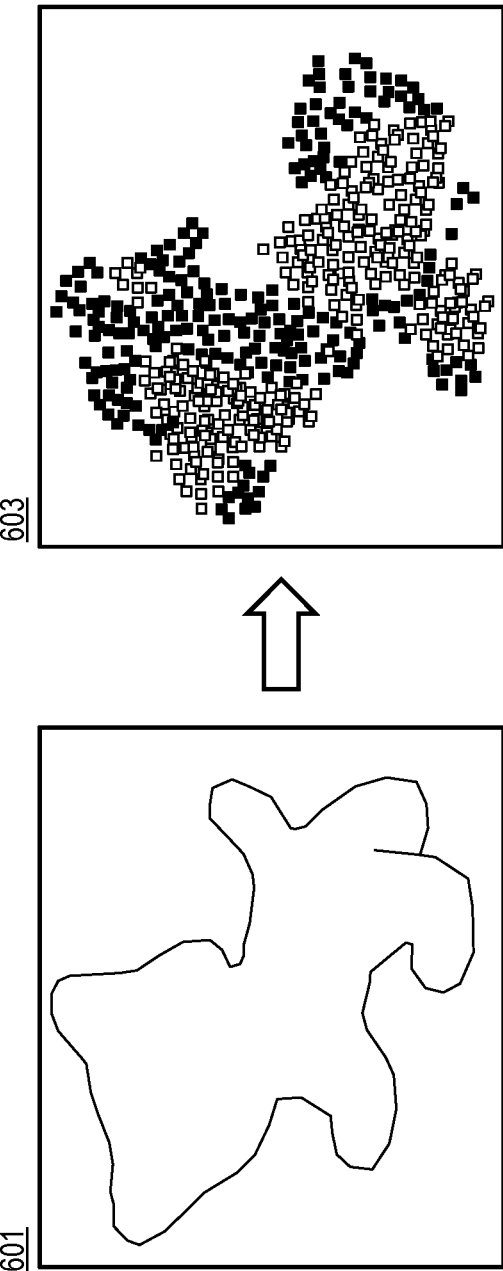
FIG. 6 is a diagram illustrating an example of object points with attributes indicating corresponding geometric parts of the object, according to one example embodiment.

FIG. 6 is a diagram illustrating an example of object points with attributes indicating corresponding geometric parts of the object, according to one example embodiment. The example of FIG. 6 is illustrative for "colored" key points representing object pose. As shown, image 601 is an original image of a cat with a certain pose. Then, image 603 is a "colored" version in which the system 115 has attributed differently shaded representative points to different geometric parts (e.g., body parts) of the cat. Each different shade of the points represents a different body part. Then, given that a deep learning model can regress subsets of points that identify spatial geometric expansions of different body parts, the pose of the cat can be inferred out from the synthesized spatial distributions of all subsets of representative points, i.e., a cat facing inwards to the left.

As previously discussed, in one embodiment, the feature representation network (e.g., machine learning object detection system 115) extracts multi-scale image feature representations of the object 101. In this way, the object 101 is detected based on the multi-scale image feature representations. For example, the set of points are regressed from an object center of the object 101 based on the multi-scale feature representations to determine an initial set of initial points representing the object 101 as discussed with respect to FIG. 4. When an object is detected in an image by the feature representation network, it means that the network has identified the presence and location of the object within the image. The feature representation network processes the input image and extracts relevant features (e.g., using a multi-scale image feature representation) that describe the characteristics and patterns present in the image. Based on these extracted features, the network makes predictions about the presence of objects and their spatial locations as a set of initial key points.

Then, the machine learning object detection system 115 selects the set of points (e.g., refined or final point set) from the initial set of initial points based on one or more point set quality assessment metrics. In one embodiment, the one or more point set quality assessment metrics include a classification quality, a spatial alignment quality, a point cloud alignment quality, an associated point set feature representation correlation, or a combination thereof.

In one embodiment, the feature representation network is trained using a focal loss as an object classification loss term. In addition, the feature representation network is trained using a spatial association loss for the set of points. The feature representation network is further trained using a localization and alignment loss. The metrics used for this quality assessment include but are not limited to:

(1) Classification quality measured by initial point set proposal confidence. Classification quality can be measured by initial point set proposal confidence through various metrics that evaluate the reliability of the proposed points in representing specific object categories or classes. The confidence associated with each proposed point set indicates the likelihood that the points accurately correspond to the target objects within the image.

(2) Spatial alignment quality measured by convex Generalized Intersection over Union (GloU) between MinAreaRect and the GT (ground truth) R-BBox (rotated bounding box) of the detected object. This assessment evaluates how well the detected object points align with the ground truth bounding box in terms of spatial coverage and orientation. The MinAreaRect represents the smallest convex polygon that encloses all detected points, while the GT R-BBox defines the ground truth bounding box of the object. By calculating the convex GIOU between these two representations, the machine learning object detection system 115 can quantify the spatial overlap and alignment between the detected points and the ground truth bounding box. A higher GIOU value indicates better spatial alignment and coverage of the detected points with respect to the ground truth, thereby providing a measure of the quality of object detection and spatial localization. The GIOU, for instance, is a metric used to measure the spatial overlap and alignment between two bounding boxes or regions in object detection tasks. It quantifies the similarity between the predicted bounding box and the ground truth bounding box by considering both their intersection and union areas, as well as their spatial arrangement. GIoU accounts for differences in size, orientation, and position between the two bounding boxes, providing a more robust measure of spatial alignment compared to traditional Intersection over Union (IoU) metrics. A GIOU value of 1 indicates perfect alignment between the predicted and ground truth bounding boxes, while lower values indicate less spatial overlap or misalignment.

(3) Point cloud alignment quality measured by Chamfer distance between a "colored" point set and re-sampled GT body parts of overhead objects. The quality of detected object points can be assessed using point cloud alignment quality measured by the Chamfer distance between a "colored" point set and resampled ground truth (GT) body parts of overhead objects. In this assessment, the "colored" point set represents the detected object points, where each point is labeled with attributes indicating specific geometric parts of the object. The ground truth body parts are represented as resampled point clouds, providing a reference representation of the object's structure and spatial extent. The Chamfer distance is then calculated between the detected points and the resampled ground truth body parts, quantifying the dissimilarity or misalignment between them. A lower Chamfer distance indicates better alignment and spatial correspondence between the detected points and the ground truth body parts, thereby serving as a measure of the quality of object detection and spatial localization in overhead imagery. Chamfer distance is a metric used to quantify the dissimilarity or discrepancy between two sets of points or shapes. It measures the average distance of each point in one set to the nearest point in the other set, and vice versa.

(4) Associated point set feature representation correlation measured by cosine similarities. In this assessment, each detected object point is associated with a feature representation (e.g., vector representation) derived from a neural network. The cosine similarity is then computed between the feature representations of the detected object points and the corresponding ground truth points. Cosine similarity is a metric used to measure the similarity between two vectors in a multi-dimensional space. It calculates the cosine of the angle between the two vectors, providing a measure of their directional similarity. A higher cosine similarity indicates greater correlation or similarity between the feature representations, suggesting that the detected points accurately capture the characteristics of the ground truth points.

Based on the above quality assessment, top-k high quality point sets are further refined and are used for training loss computations. Training loss computations refer to the process of calculating a numerical measure of the discrepancy between the predicted outputs of a machine learning model and the true labels or targets during the training phase. The training loss serves as a feedback signal that guides the model's parameter updates in the direction that minimizes prediction errors.

In one embodiment, for loss computation, "colored" point sets for each of the GT (Ground Truth) objects can be optimally selected to minimize noise to the back-propagation process. To this end, the quality of point representation samples from the initialization proposal stage are assessed before sending to the refinement stage (e.g., as described above). For example, assessing the quality of point representation samples helps minimize noise in the back-propagation process during model training by providing a mechanism to filter out unreliable or noisy samples. Noisy samples can introduce inconsistencies or inaccuracies in the gradient updates computed during back-propagation, leading to suboptimal model performance and slower convergence. By evaluating the quality of point representation samples, such as assessing their alignment with ground truth data or measuring their feature representation correlation, the machine learning object detection system 115 can identify and discard samples that do not accurately represent the underlying patterns or characteristics of the data. This selective filtering of noisy samples helps to ensure that the gradient updates computed during back-propagation are based on reliable and informative data points, facilitating more stable and effective learning of the model parameters. As a result, the training process becomes more robust to noise, leading to improved convergence and generalization performance of the model.

In one embodiment, for training the "colored" representative point set based overhead object detection model, the following error terms (or equivalent) are designed and computed during the model training process to update model parameters via the back-propagation mechanism.

First, for the object classification loss term, Focal loss is a type of loss function used for object classification tasks in deep learning. It is specifically designed to address the class imbalance problem, where the number of samples in one class significantly outweighs the number of samples in other classes. This imbalance can lead to suboptimal model performance, as the model may prioritize learning the majority class at the expense of minority classes. Focal loss introduces a modulating factor into the standard cross-entropy loss function, which down-weights the loss contribution from well-classified examples. This modulation factor focuses more attention on hard-to-classify examples, or those with high prediction error. In other words, focal loss assigns lower weights to easy-to-classify examples, thereby reducing their influence on the overall loss.

$$L_{cls} = \frac{1}{N}\sum\nolimits_i FL(pt) = \frac{1}{N}\sum\nolimits_i -\alpha t(1-pt)\gamma \log(pt),$$

where pt is the predicted probability of the true class, and $\gamma$ is a tunable focusing parameter. When $\gamma=0$, focal loss reduces to standard cross-entropy loss. Increasing $\gamma$ emphasizes the importance of hard-to-classify examples.

Second, the colored point set spatial association loss is designed as:

$$L_{sa} = \frac{1}{N_p}\frac{1}{N_o}\sum\nolimits_i \rho_i,$$

-continued where $$\rho = \begin{cases} \|p_p - c_{GT}\|, & p_p \text{ is out side of } GT \text{ part region} \\ 0, & \text{else} \end{cases}$$

This loss function is designed to measure the alignment or spatial correspondence between two sets of points, such as detected object points and ground truth points. The point set spatial association loss aims to minimize the discrepancy or misalignment between the detected points and the ground truth points. It considers various factors such as point-to-point distances, geometric relationships, and structural similarities to quantify the spatial association between the two sets of points. By minimizing this loss, the model learns to accurately localize and align the detected points with the ground truth points, leading to improved performance in tasks such as object localization, pose estimation, and shape reconstruction.

Third, the localization and alignment loss:

$$L_{loc} = \frac{1}{N} \sum_i GIoU(MAR(p), RB_{GT})$$

where, MAR( ) stands for the MeanAreaRect method, and RB stands for rotated bounding box. It refers to the loss function used to measure the discrepancy between the predicted bounding box coordinates and the ground truth bounding box coordinates of objects in an image. In object detection, the goal is not only to classify objects but also to accurately localize them within the image. This involves predicting the coordinates of the bounding boxes that tightly enclose the objects of interest. The localization and alignment loss function typically penalizes the model for deviations between the predicted bounding box coordinates (such as the top-left and bottom-right corners) and the corresponding ground truth coordinates.

In step 503, the machine learning object detection system 115 uses the feature representation network to construct a bounding box around the spatial extent of the object based on the set of points. In one embodiment, the machine learning object detection system 115 can use a function such as but not limited to minimum area rectangle (MinRectArea) to construct the bounding box around the set of points. For example, the MinRectArea process initially identifies the extreme points of the point set, determining the minimum and maximum coordinates along the x and y axes to establish the boundaries of the rectangle. Then, the minimum area rectangle is constructed, tightly enclosing the point set while minimizing unnecessary space. This approach ensures that the resulting bounding box effectively captures the spatial extent of the point set with minimal area.

In step 505, the machine learning object detection system 115 determines a pose of the bounding box based on the attribute indicating the geometric part of the object for each point. In one embodiment, the pose is determined from a spatial distribution of the set of points. This attribution of points to geometric parts provides information about the object's structure from which the pose can be inferred. This inference involves assessing the arrangement and orientation of points associated with different geometric parts to ascertain the overall positioning and orientation of the object in space. By considering known geometric relationships between various parts of the object, the machine learning object detection system 115 can accurately determine the pose of the bounding box.

Figure 7:
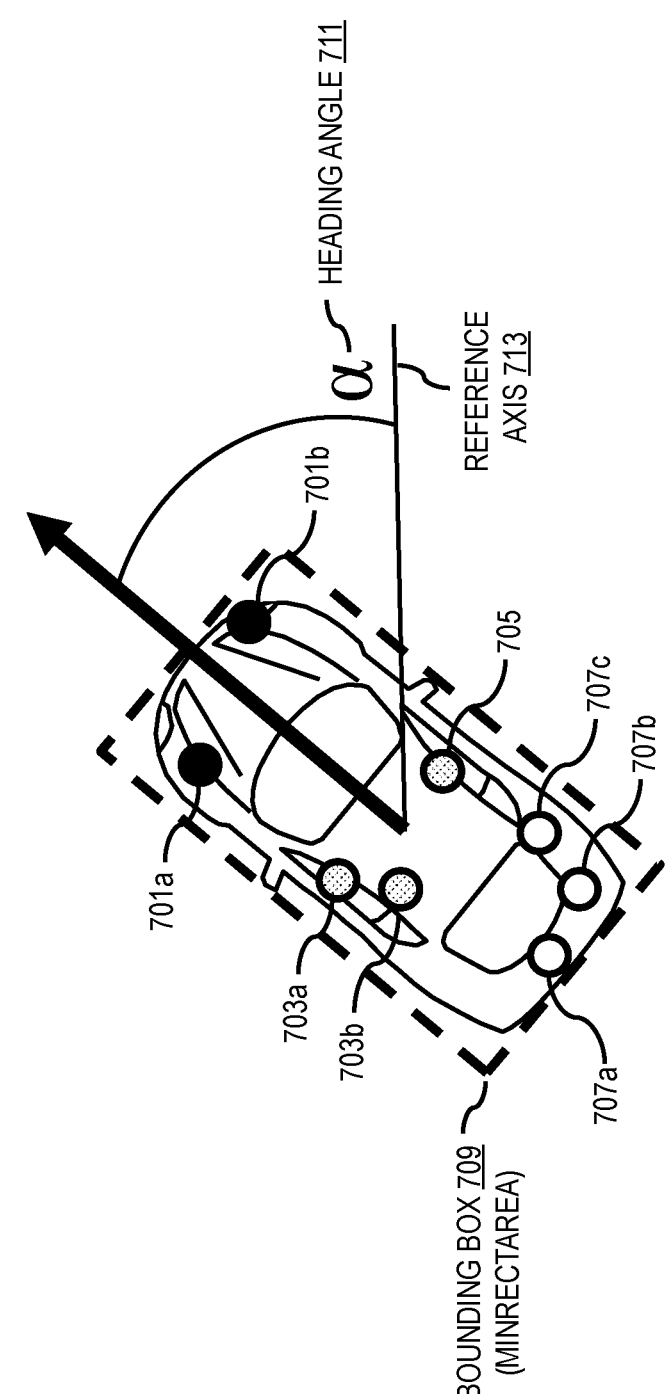
FIG. 7 is a diagram illustrating an example of an object pose determined based on object points with attributes indicating corresponding geometric parts of the object, according to one example embodiment.

FIG. 7 is a diagram illustrating an example of an object pose determined based on object points with attributes indicating corresponding geometric parts of the object, according to one example embodiment. The example of FIG. 7 provides a more specific demonstration to overhead vehicle detection and heading angle estimation using deep learning model regressed characteristic key points. First, given all the identified key body points (e.g., points 701a and 701b attributed to the front of vehicle, points 703a and 703b attributed to the left of the vehicle, point 705 attributed to the right of the vehicle, and points 707a-707c attributed to the rear of the vehicle), a MinAreaRect function can compute the tightest rotation bounding box 709 for the vehicle in an overhead image view to localize its position and orientation. Next, given the result of "colored" point set groups, (e.g., points 701a and 701b attributed to the front of vehicle, points 703a and 703b attributed to the left of the vehicle, point 705 attributed to the right of the vehicle, and points 707a-707c attributed to the rear of the vehicle), a HeadingAngleEstimator function can infer the vehicle heading angle α 711 from the spatial distribution of these point subsets. For example, the HeadingAngleEstimator function initially selects a reference axis 713, e.g., based on the vehicle's orientation or scene layout, to serve as a baseline for angle determination. Subsequently, the function scrutinizes the distribution of detected points relative to this reference axis. With this analysis, the function infers the vehicle's orientation or direction based on the dominant axis of the point distribution based on the geometric parts of the vehicle. Finally, utilizing the inferred orientation, the function calculates the vehicle's heading angle 711 relative to a predefined reference frame.

In step 507, the machine learning object detection system 115 provides the object, the pose, or a combination thereof as an output. In one embodiment, the output includes the object detection data 117 comprising the objection classification data 119 and the object pose data 121. Object classification data 119 includes information about the detection object's class or category (e.g., "vehicle"). Object pose data 121 includes information about the spatial orientation and positioning of the detected objects within the scene. This data may consist of its rotated bounding box relative to a reference frame, such as its heading angle or rotation. In embodiments using a 3D frame of reference, the pose data can include a pitch angle and/or yaw angle. The output can optionally include additional attributes such as but not limited to confidence scores and/or any other quality assessment metrics.

In one embodiment, the output (e.g., intersection data, intersection comparison data, etc.) of the machine learning object detection system 115 can be used for automated map creation and/or update processes. In other embodiments, the output can be transmitted over a communication network 129 to other components of the system 100 or other components with access to the system 100 such as but not limited to a services platform 131, services 133, content providers 135, and/or the like that can use the output of the system 100 to provide one or more functions, services, applications, etc.

Figure 8:
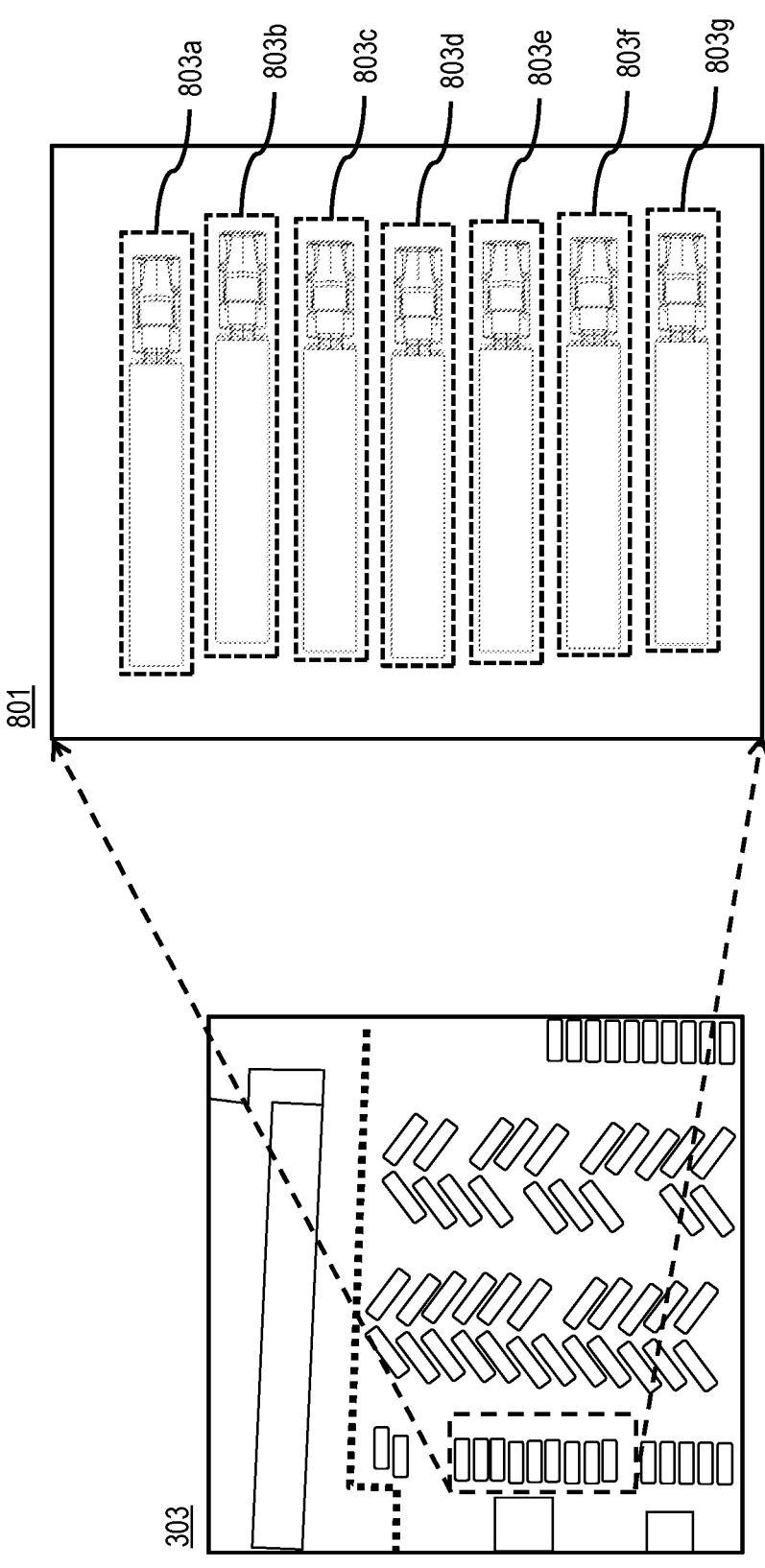
FIG. 8 is a diagram illustrating an example of inference results, according to one example embodiment.

FIG. 8 is a diagram illustrating an example of inference results, according to one example embodiment. The example of FIG. 8 is based on the same overhead image 303 presented in FIG. 3. However, instead of generating traditional results 301, the various embodiments described herein are used to generate inference results 801 that are based on the point regression approach described herein. In this case, the machine learning object detection system 115 has detected all instances 803a-803g of the parked trucks with angular errors within specified accuracy thresholds.

In optional step 509, the mapping platform 101 generates lane level path mapping data of a geographic database based on the object, the pose, or combination thereof. Lane-level mapping is an important aspect of geographic database 109 generation, particularly for applications like navigation, autonomous driving, and traffic management systems. It involves the precise delineation and characterization of individual lanes within road networks, providing detailed information about lane boundaries, markings, and geometry. Lane-level mapping enables vehicles to accurately determine their position within specific lanes, understand lane-specific rules and regulations, and plan maneuvers such as lane changes and turns with high precision.

To achieve lane-level mapping, data from the machine learning object detection system 115, which identify vehicles and other objects within the scene can be used. The machine learning object detection system 115 provides information about the spatial extent and poses of detected objects (e.g., vehicles), including their positions and orientations relative to the road network. By associating detected objects with lane boundaries and road segments, the mapping platform can infer the presence and occupancy of lanes by vehicles and other objects. This process may involve analyzing the distribution of detected objects within the scene, matching them to known lane configurations, and updating the geographic database with lane-specific attributes such as lane widths, directions, and restrictions.

Figure 9:
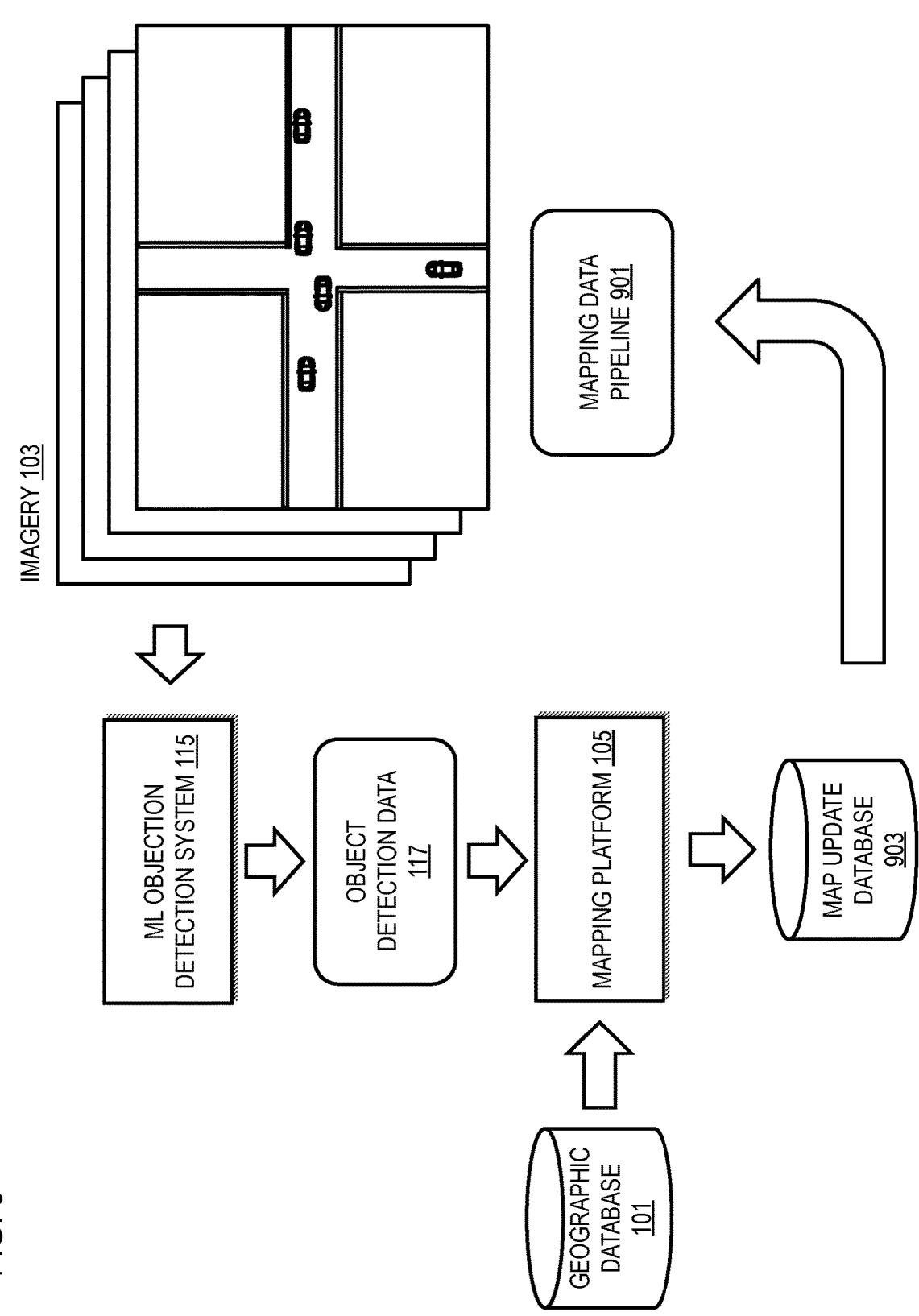
FIG. 9 is a diagram of a map data generation pipeline based on object detection inference results, according to one example embodiment.

FIG. 9 is a diagram of a map data generation pipeline 901 based on object detection inference results, according to one example embodiment. In one embodiment, the process for detecting objects and their poses can be performed as part of an automated mapping pipeline 901. Automated refers, for instance, to operating the pipeline 901 without manual intervention in all or a portion of the pipeline from data ingestion to output of the resulting map update database 903. Thus, the various embodiments described herein provide technical improvements to the map making pipeline or system 100 by introducing an improved objection and pose detection from overhead imagery 103 where objects/vehicles may appear small in size and are hard to detect accurately. As shown, machine learning object detection system 115 receives and processes imagery 103 according to the various embodiments described herein to generate object detection data 117 (e.g., including object pose data 121).

The mapping platform 105 aggregates and analyzes the objection data 117 to detect and/or characterize lane-level road network topology. In one embodiment, the detected and/or characterized lane-level road network topology can be stored directly in the geographic database 109. In addition or alternatively, the lane-level road network topology can be stored in a map update database 903 which can then be processed through a mapping data pipeline 901 before being published to the geographic database 109 and/or provided as an output (e.g., to end users such as autonomous vehicles or other mapping/navigation services users).

Returning to FIG. 1, as shown and discussed above, the system 100 includes the machine learning object detection system 115 and mapping platform 105 for providing object detection and pose estimation from imagery 103. In one embodiment, the machine learning object detection system 115 and/or mapping platform 105 have connectivity or access to one or more databases for storing the object detection data 117 determined according to the various embodiments described herein, and as well as a geographic database 109 for retrieving mapping data and/or related attributes for object detection. In one embodiment, the geographic database 109 can include electronic or digital representations of mapped geographic features mapped or determined based on the object detection data 117. In one embodiment, the machine learning object detection system 115 and/or mapping platform 105 has connectivity over a communication network 129 to the services platform 131 that provides one or more services 133. By way of example, the services 133 may be third-party services that rely on location-based services created or developed based on the object detection data 117 generated according to the various embodiments described herein. By way of example, the services 133 include, but are not limited to, autonomous/semi-autonomous vehicle operation, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 133 uses the output of the mapping platform 105.

In one embodiment, the machine learning object detection system 115 and/or mapping platform 105 may be a platform with multiple interconnected components. The machine learning object detection system 115 and/or mapping platform 105 may include multiple servers, intelligent networking devices, computing devices, components, and corresponding software for automated detection and/or characterization of road intersections. In addition, it is noted that the machine learning object detection system 115 and/or mapping platform 105 may be separate entities of the system 100, a part of the one or more services 133, a part of the services platform 131, or included within the vehicles 101.

In one embodiment, content providers 135 may provide content or data (e.g., including geographic data, 3D models, parametric representations of mapped features, etc.) to the mapping platform 105, the services platform 131, the services 133, and/or the vehicles 101. The content provided may be any type of content, such as object detection data, lane level road topology data, sensor data, map content, textual content, audio content, video content, image content, etc. used for detecting and/or characterizing road intersections. In one embodiment, the content providers 135 may also store content associated with the mapping platform 105, geographic database 109, services platform 131, services 133, and/or vehicle 101. In another embodiment, the content providers 135 may manage access to a central repository of data, and offer a consistent, standard interface to data, such as a repository of the geographic database 109.

In one optional embodiment, the vehicles 101 are configured with various sensors for generating or collecting sensor observations (e.g., for processing by the machine learning object detection system 115 and/or mapping platform 105), related geographic data, etc. In one embodiment, the sensed data represents sensor data associated with a geographic location or coordinates at which the sensor data was collected to detect road boundaries of an intersection. In this way, the sensor data can act as observation data that can be processed using mesh triangulation according to the various embodiments described herein. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road boundaries, road sign information, images of road obstructions, etc. for analysis), LiDAR, radar, an audio recorder for gathering audio data, velocity sensors mounted on steering wheels of the vehicles, switch sensors for determining whether one or more vehicle switches are engaged, and the like.

In another optional embodiment, the communication network 129 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), 5G New Radio Networks, Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning object detection system 115, mapping platform 105, services platform 131, services 133, vehicle 101, and/or content providers 135 optionally communicate with each other and other components of the system 100 using well known, new or still developing protocols. In this context, a protocol includes a set of rules defining how the network nodes within the communication network 129 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 10:
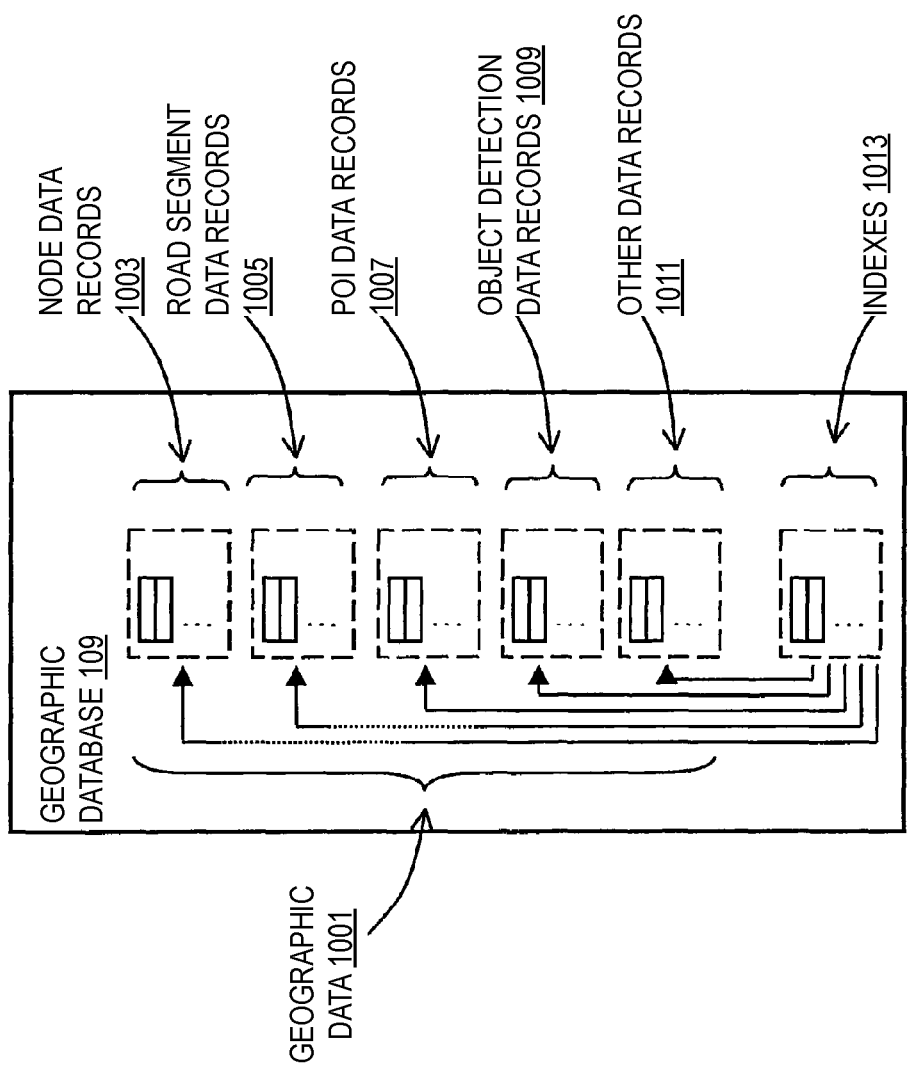
FIG. 10 is a diagram of a geographic database, according to one embodiment.

FIG. 10 is a diagram of the geographic database 109, according to one embodiment. In one embodiment, the geographic database 109 includes geographic data 1001 used for (or configured to be compiled to be used for) mapping and/or navigation-related services, such as for video odometry based on the parametric representation of signs include, e.g., encoding and/or decoding parametric representations into object models of signs. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1003, road segment or link data records 1005, POI data records 1007, object detection data records 1009, other records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 109. In one embodiment, the indexes 1013 may be used to quickly locate data without having to search every row in the geographic database 109 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (such as intersections) corresponding to the respective links or segments of the road segment data records 1005. The road link data records 1005 and the node data records 1003 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1007. The geographic database 109 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 109 can also include object detection data records 1009 for storing object detection data 117, path data 107, and or any related data generated or used according to the various embodiments described herein. In one embodiment, the object detection data records 1009 can be associated with one or more of the node records 1003, road segment records 1005, and/or POI data records 1007 to associate the detected and/or characterized intersections with specific geographic locations. In this way, the detected and/or characterized intersections can also be associated with the characteristics or metadata of the corresponding records 1003, 1005, and/or 1007.

In one embodiment, the geographic database 109 can be maintained by the content provider 135 in association with the services platform 131 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle (e.g., vehicle) along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database or data in the master geographic database can be in an Oracle spatial format or other spatial format, such as for development or production purposes. Map layers may be utilized. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing object detection and pose estimation from overhead imagery may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 11:
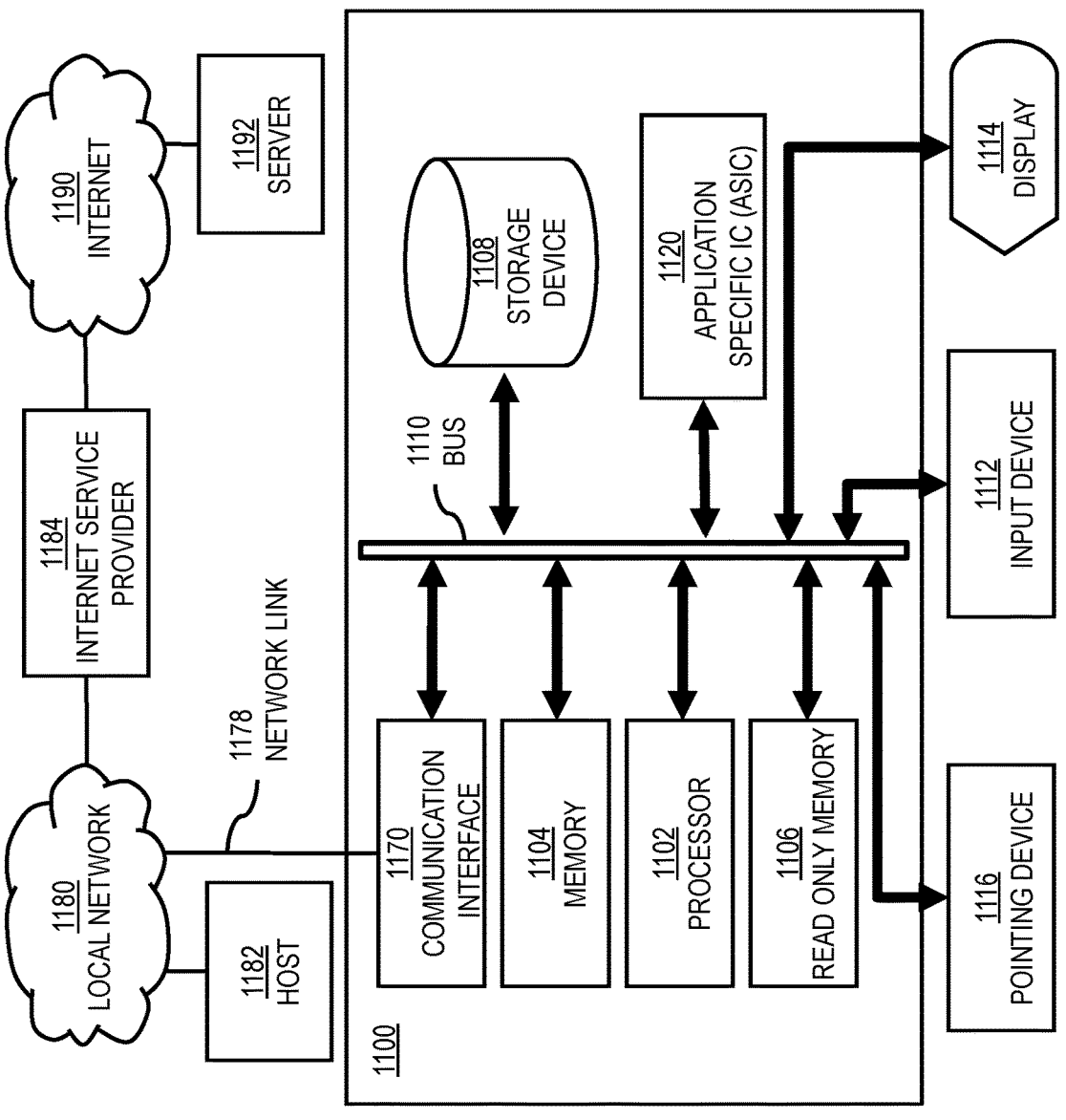
FIG. 11 is a diagram of hardware that can be used to implement an embodiment of the invention.

FIG. 11 illustrates a system 1100 (e.g., a computer system and components of an cloud environment in which the computer system operates) upon which an embodiment of the invention may be implemented. System 1100 is programmed (e.g., via computer program code or instructions) to provide object detection and pose estimation from overhead imagery as described herein and includes a communication mechanism such as a bus 1110 for passing information between other internal and external components of the system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states $(0, 1)$ of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing object detection and pose estimation from overhead imagery. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

System 1100 also includes a memory 1104 coupled to bus 1110. The memory 1104, such as a random access memory (RAM) or other dynamic storage device, stores information including processor instructions for providing object detection and pose estimation from overhead imagery. Dynamic memory allows information stored therein to be changed by the system 1100. RAM allows a unit of information stored at a location called a memory address to be stored and retrieved independently of information at neighboring addresses. The memory 1104 is also used by the processor 1102 to store temporary values during execution of processor instructions. The computer 1100 also includes a read only memory (ROM) 1106 or other static storage device coupled to the bus 1110 for storing static information, including instructions, that is not changed by the computer 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the system 1100 is turned off or otherwise loses power.

Information, including instructions for providing object detection and pose estimation from overhead imagery, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

System 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 129 for providing object detection and pose estimation from overhead imagery.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide object detection and pose estimation from overhead imagery as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to providing object detection and pose estimation from overhead imagery. The memory 1205 also stores the data associated with or generated by the execution of the inventive steps.

Figure 13:
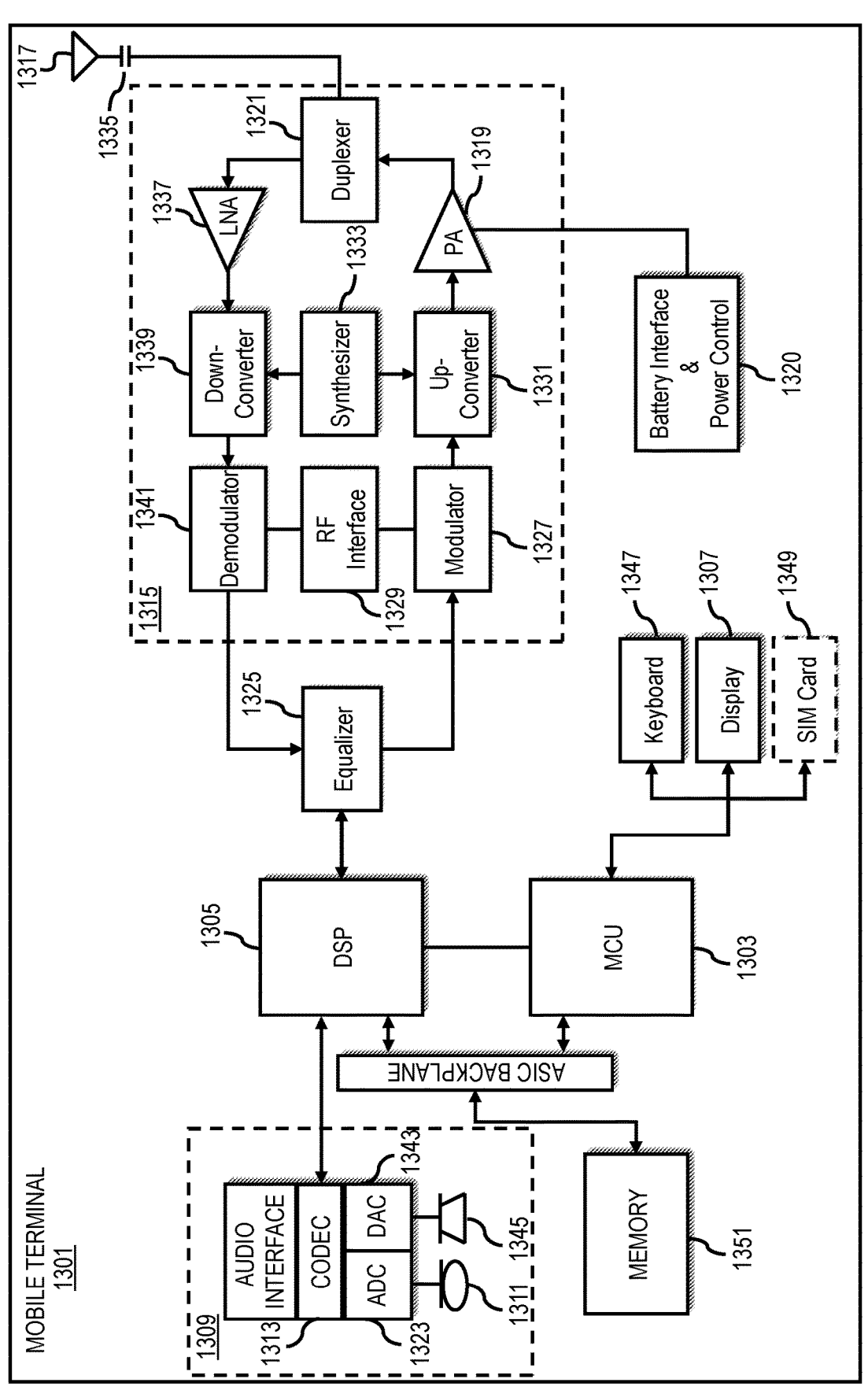
FIG. 13 is a diagram of a mobile terminal that can be used to implement an embodiment of the invention.

FIG. 13 is a diagram of exemplary components of a mobile terminal 1301 (e.g., vehicle 101 and/or component thereof) capable of operating in the system of FIG. 1, according to one embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide object detection and pose estimation from overhead imagery. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for detecting a vehicle object and a pose of the vehicle object in overhead imagery comprising:

processing an overhead image using a feature representation network to generate a set of points representing the vehicle object detected in the overhead image, wherein each point has an attribute indicating a geometric part of the vehicle object to represent a spatial extent of the vehicle object;

using the feature representation network to construct a bounding box around the spatial extent of the vehicle object based on the set of points;

determining the pose of the vehicle object based on the bounding box and the attribute indicating the geometric part of the vehicle object for each point;

providing the pose as an output; and generating lane level path mapping data of a geographic database based on the pose.

2. The method of claim 1, wherein the pose is determined from a spatial distribution of the set of points.

3. The method of claim 1, wherein the feature representation network extracts multi-scale image feature representations of the vehicle object, and wherein the vehicle object is detected based on the multi-scale image feature representations.

4. The method of claim 3, wherein the processing the overhead image comprises:

regressing an initial set of initial points representing the vehicle object from an object center of the vehicle object based on the multi-scale feature representations; and selecting the set of points from the initial set of initial points based on one or more point set quality assessment metrics.

5. The method of claim 4, wherein the one or more point set quality assessment metrics include a classification quality, a spatial alignment quality, a point cloud alignment quality, an associated point set feature representation correlation, or a combination thereof.

6. The method of claim 1, wherein the geometric part of the vehicle object is determined from one of a plurality of semantic parts of the vehicle object.

7. The method of claim 6, wherein the plurality of semantic parts include a front, a rear, a left side, and a right side of the vehicle object.

8. The method of claim 1, wherein the feature representation network is trained using a spatial association loss for the set of points.

9. The method of claim 1, wherein the feature representation network is trained using a localization and alignment loss.

10. An apparatus for detecting a vehicle object and a pose of the vehicle object in overhead imagery comprising:

at least one processor; and at least one memory including computer program code for one or more programs, the at least one memory and the computer program code configured to, with the at least one processor, cause the apparatus to:

process an overhead image using a feature representation network to generate a set of points representing the vehicle object detected in the overhead image, wherein each point has an attribute indicating a geometric part of the vehicle object to represent a spatial extent of the vehicle object;

use the feature representation network to construct a bounding box around the set of points;

determine the pose of the vehicle object based on the bounding box and the attribute indicating the geometric part of the vehicle object for each point;

provide the pose as an output; and generate lane level path mapping data of a geographic database based on the pose.

11. The apparatus of claim 10, wherein the pose is determined from a spatial distribution of the set of points.

12. The apparatus of claim 10, wherein the feature representation network extracts multi-scale image feature representations of the vehicle object, and wherein the vehicle object is detected based on the multi-scale image feature representations.

13. The apparatus of claim 12, wherein, to process the overhead image, the apparatus is caused to:

regress an initial set of initial points representing the vehicle object from an object center of the vehicle object based on the multi-scale feature representations; and select the set of points from the initial set of initial points based on one or more point set quality assessment metrics.

14. The apparatus of claim 13, wherein the one or more point set quality assessment metrics include a classification quality, a spatial alignment quality, a point cloud alignment quality, an associated point set feature representation correlation, or a combination thereof.

15. A non-transitory computer-readable storage medium for detecting a vehicle object and a pose of the vehicle object in overhead imagery, carrying one or more sequences of one or more instructions which, when executed by one or more processors, cause an apparatus to perform:

processing an overhead image using a feature representation network to generate a set of points representing the vehicle object detected in the overhead image, wherein each point has an attribute indicating a geometric part of the vehicle object to represent a spatial extent of the vehicle object;

using the feature representation network to construct a bounding box around the spatial extent of the vehicle object based on the set of points;

determining the pose of the vehicle object based on the bounding box and the attribute indicating the geometric part of the vehicle object for each point;

providing the pose as an output; and generating lane level path mapping data of a geographic database based on the pose.

16. The non-transitory computer-readable storage medium of claim 15, wherein the pose is determined from a spatial distribution of the set of points.

17. The non-transitory computer-readable storage medium of claim 15, wherein the feature representation network extracts multi-scale image feature representations of the vehicle object, and wherein the vehicle object is detected based on the multi-scale image feature representations.

* * * * *